United States Patent
Yuan et al.

(10) Patent No.: US 11,388,630 B2
(45) Date of Patent: Jul. 12, 2022

(54) INFORMATION PROCESSING METHOD AND DEVICE IN BASEBAND PROCESSING SPLIT ARCHITECTURE, AND STORAGE MEDIUM

(71) Applicant: ZTE Corporation, Shenzhen (CN)

(72) Inventors: Xiaxiang Yuan, Shenzhen (CN); Wei Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/058,956

(22) PCT Filed: Jun. 13, 2019

(86) PCT No.: PCT/CN2019/091125
§ 371 (c)(1),
(2) Date: Nov. 25, 2020

(87) PCT Pub. No.: WO2020/019897
PCT Pub. Date: Jan. 30, 2020

(65) Prior Publication Data
US 2021/0219182 A1 Jul. 15, 2021

(30) Foreign Application Priority Data
Jul. 24, 2018 (CN) .......................... 201810821251.4

(51) Int. Cl.
*H04W 28/08* (2009.01)
*H04W 72/00* (2009.01)

(52) U.S. Cl.
CPC ... *H04W 28/0835* (2020.05); *H04W 28/0815* (2020.05); *H04W 28/0983* (2020.05)

(58) Field of Classification Search
CPC ............. H04W 28/08; H04W 28/0812; H04W 28/0804; H04W 28/0815; H04W 28/0835;
(Continued)

(56) References Cited

U.S. PATENT DOCUMENTS 7,665,092 B1 * 2/2010 Vengerov ............... G06F 9/5088
718/105
10,973,000 B2 * 4/2021 Jia ......................... H04W 72/12
(Continued)

FOREIGN PATENT DOCUMENTS

CN        103037525 A     4/2013
CN        105813133 A     7/2016
(Continued)

OTHER PUBLICATIONS

Altiostar Networks, et al. "HLS Architecture Principles", 3GPP Draft; R3-171951 HLS Architecture Principles—Altiostar, 3rd Generation Partnership Project (3GPP), May 19, 2017, p. 1-2, vol. RAN WF3, No. Hangzhou May 15, 2017-May 19, 2017, XP051286111, Sophia-Antipolis Cedex, France.
(Continued)

*Primary Examiner* — Ahmed Elallam
(74) *Attorney, Agent, or Firm* — Vivacqua Crane, PLLC

(57) ABSTRACT

An information processing method and device in a baseband processing split architecture, and a computer storage medium, the method includes: receiving, by a distributed unit (DU), load information of a plurality of central units (CUs), and determining, by the DU and according to the load information of the plurality of CUs, a first CU having a load greater than a target threshold value and a second CU having a load less than the target threshold value among the plurality of CUs; and, sending, by the DU, control signaling to the first CU and the second CU respectively to instruct to migrate cell data of the first CU from the first CU to the second CU to balance the load among the plurality of CUs.

13 Claims, 5 Drawing Sheets

(58) Field of Classification Search
CPC ............ H04W 28/0983; H04W 72/00; H04W 88/085
See application file for complete search history.

(56) References Cited

U.S. PATENT DOCUMENTS

| | | | | |
|---|---|---|---|---|
| 11,129,086 | B2* | 9/2021 | Zhang | .................... H04W 12/08 |
| 2013/0225174 | A1* | 8/2013 | Hunukumbure | ...... H04W 36/22 |
| | | | | 455/436 |
| 2015/0304889 | A1* | 10/2015 | Qian | ................ H04W 72/1289 |
| | | | | 370/235 |
| 2017/0346705 | A1* | 11/2017 | Szilagyi | ................ H04W 24/02 |
| 2020/0059936 | A1* | 2/2020 | Li | ........................ H04W 72/044 |
| 2020/0145873 | A1* | 5/2020 | Park | .................. H04W 28/0284 |
| 2020/0187113 | A1* | 6/2020 | Mwanje | ................ H04W 28/08 |
| 2020/0204252 | A1* | 6/2020 | Barbieri | ................ H04W 36/08 |
| 2020/0267576 | A1* | 8/2020 | Bedekar | ................ G06F 9/5077 |
| 2020/0374946 | A1* | 11/2020 | Bedekar | ................ H04W 92/04 |
| 2021/0045048 | A1* | 2/2021 | Li | ........................ H04W 48/18 |
| 2021/0058879 | A1* | 2/2021 | Geng | ................ H04W 72/042 |

FOREIGN PATENT DOCUMENTS

| | | | | |
|---|---|---|---|---|
| CN | 106162749 | A | | 11/2016 |
| CN | 106454951 | A | | 2/2017 |
| CN | 107925989 | A | | 4/2018 |
| CN | 104468759 | B | | 6/2018 |
| CN | 108271219 | A | | 7/2018 |
| CN | 109548037 | A | * | 3/2019 ............ H04W 24/02 |

OTHER PUBLICATIONS

Ericsson. "S1 Flex Load balancing", 3GPP Draft; R3-080317, 3rd Generation Technical Fields Partnership Project (3GPP), Feb. 5, 2008, p. 1-3; Figure 2, vol. RAN WG3, No. Sorrento, Italy; Feb. 5, 2008, XP050163526, Sophia-Antipolis Cedex, France.
European Patent Office, Search Opinion for EP Application No. 19840541.7, dated May 11, 2021, pp. 1-9.
European Patent Office, Supplementary European Search Report for EP Application No. 19840541.7, dated May 11, 2021, pp. 1-5.
International Search Report and Written Opinion for the International Patent Application No. PCT/CN2019/091125, dated Aug. 1, 2019 (9 pages).
3GPP Technical Specification Group Radio Access Network. "Discussion on the scenarios of multiple SCTP associateions between CU and DU," 3GPP TSG-RAN WG3 #97, Aug. 21-25, 2017, pp. 1-3.
3GPP Technical Specification Group Radio Access Network. "UE Reject Indication and gNB-DU admission result," 3GPP TSG-RAN WG3 NR AdHoc 1801, Jan. 22-26, 2018, pp. 1-7.
The State Intellectual Property Office of People's Republic of China. First Office Action for CN Application No. 201810821251.4 and English translation, dated May 5, 2022, pp. 1-15.
The State Intellectual Property Office of People's Republic of China. First Search Report for CN Application No. 201810821251.4 and English translation, dated Apr. 26, 2022, pp. 1-6.

* cited by examiner

INFORMATION PROCESSING METHOD AND DEVICE IN BASEBAND PROCESSING SPLIT ARCHITECTURE, AND STORAGE MEDIUM

CROSS-REFERENCE TO RELATED APPLICATION

This application is a national stage filing under 35 U.S.C. § 371 of international application number PCT/CN2019/091125, filed Jun. 13, 2019, which claims priority to Chinese patent application No. 201810821251.4, filed Jul. 24, 2018. The contents of these applications are incorporated herein by reference in their entirety.

TECHNICAL FIELD

The present application relates to, but not limited to, the field of wireless communication, and more particularly, to an information processing method and device in a baseband processing split architecture, and a computer storage medium.

BACKGROUND

With the development of the mobile communication technology, 5G (5th generation) has come into people's vision. In 5G, the BBU (Building Baseband Unit) function is reconstructed into two functional entities, i.e., CU (Central Unit) and DU (Distributed Unit). Specifically, the CRAN (Cloud Radio Access Network) has been deeply studied in 5G, and the CRAN includes CUs and DUs. FIG. 1 shows a CU-DU split system architecture, wherein a group of CUs (at least two CUs) (e.g., a first CU 21 and a second CU 22) are connected to a core network 11, respectively. Signaling parameters and data may be transmitted between the core network and the CUs through the interfaces between the CUs and the core network. One CU may be connected to one or more DUs simultaneously. For example, the first CU 21 is connected to a first DU 31 and a second DU 32, and the second CU 22 is connected to a third DU 33. Centralized management and control of the regional Internet of Things is realized by CUs, and the support to the machine communication and the Internet of Things can be realized. Meanwhile, the real-time processing functional units (DUs) and non-real-time processing functional units (CUs) of the RAN may be deployed closer to the user, and corresponding servers and service gateways are configured to meet particular delay and reliability requirements. The C-RAN may effectively support low-delay and high-reliability services. However, there is a problem that the transmission load of the control signaling may be too high since each DU is connected to only one CU when one CU controls a plurality of CUs. Currently, there is no effective scheme to solve load balancing of CUs.

SUMMARY

An embodiment of the present application provides an information processing method in a baseband processing split architecture, including:

receiving, by a distributed unit (DU), load information of a plurality of central units (CUs), and determining, by the DU and according to the load information of the plurality of CUs, a first CU having a load greater than a target threshold value and a second CU having a load less than the target threshold value among the plurality of CUs; and sending, by the DU, control signaling to the first CU and the second CU respectively to instruct to migrate cell data of the first CU from the first CU to the second CU to balance the load among the plurality of CUs.

An embodiment of the present application provides an information processing device in a baseband processing split architecture, including:

a load determination unit, which is configured to receive load information of a plurality of central units (CUs), and determine, according to the load information of the plurality of CUs, a first CU having a load greater than a target threshold value and a second CU having a load less than the target threshold value among the plurality of CUs; and a balancing unit, which is configured to send control signaling to the first CU and the second CU respectively to instruct to migrate cell data of the first CU from the first CU to the second CU to balance the load among the plurality of CUs.

An embodiment of the present application provides an information processing device in a baseband processing split architecture, including:

a memory stored with a computer program; and
a processor configured to perform the steps of the method described in any one of the above schemes when executing the computer program.

An embodiment of the present application provides a computer-readable storage medium storing a computer program which, when executed by a processor, cause the processor to perform the steps of the method described in any one of the above schemes.

In the technical schemes of the embodiments of the present application, a DU receives load information of a plurality of CUs, and the DU determines, according to the load information of the plurality of CUs, a first CU having a load greater than a target threshold value and a second CU having a load less than the target threshold value among the plurality of CUs. The DU sends control signaling to the first CU and the second CU respectively to instruct to migrate cell data of the first CU from the first CU to the second CU to balance the load among the plurality of CUs.

Since each DU is connected to a plurality of CUs, the DU may receive load information of the plurality of CUs and send an instruction through the control signaling sent to the plurality of CUs, so as to instruct to migrate cell data of the first CU from the first CU to the second CU through the control signaling. During the processing process, by sending the control signaling to a plurality of CUs, the transmission load of the control signaling may be reduced. When the DU determines according to the load information of the plurality of CUs that the currently accessed first CU has a high load, the cell data of the first CU may be migrated from the first CU with a high load to a second CU with a low load, so that the load balancing of the CUs is solved.

DETAILED DESCRIPTION

The present application will be further described below in detail by embodiments with reference to the accompanying drawings. It should be understood that the embodiments provided herein are merely used for explaining the present application, rather than limiting the present application. In addition, the embodiments provided hereinafter are some but not all of the embodiments for performing the present application. The technical schemes recorded in the embodiments of the present application can be performed in any combination if not conflicted.

It's to be clarified that the term "include", "comprise" or any other variants thereof is intended to encompass a non-exclusive inclusion, such that a process, method, device, or system including a series of elements not only includes those elements, but also includes other elements that are not explicitly listed, or elements that are inherent to such a process, method, device, or system. In the absence of more restrictions, an element defined by the phrase "including one . . . " does not exclude the existence of additional identical elements in the process, method, device, or system that includes the element (such as steps in the method or units in the device; for example, the units may be partial circuits, partial processors, partial programs or software, etc.).

For example, the network access method provided in an embodiment of the present application includes a series of steps, but the network access method provided in the embodiment of the present application is not limited to the recorded steps. Similarly, the terminal provided in an embodiment of the present application includes a series of units, but the terminal provided in the embodiment of the present application is not limited to the units recorded clearly and may further include units required for acquiring related information or processing based on the information.

It is to be noted that, the term "first/second" involved in the embodiments of the present application is merely for distinguishing similar objects, and does not represent a particular order for objects. It should be understood that the "first/second" may be interchanged in a particular order or sequence if it is permitted. It should be understood that, the objects distinguished by the "first/second" may be interchanged as appropriate, so that the embodiments of the present application described herein can be performed in an order other than those illustrated or described herein.

Figure 2:
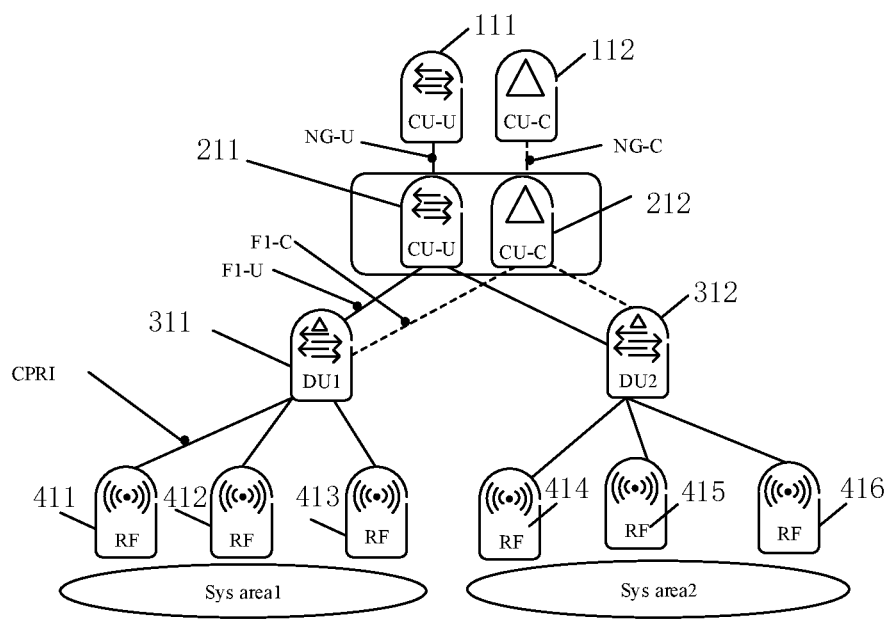
FIG. 2 is a schematic diagram of an application scenario in which an embodiment of the present application is applied.

FIG. 2 is a schematic diagram of an application scenario in which an embodiment of the present application is applied. In a C-RAN networking architecture, infrastructures such as centralized processing, collaborative radio and real-time cloud computation are integrated. The C-RAN networking architecture includes a plurality of antenna units (RFs), a plurality of DUs and a plurality of CUs. The plurality of RFs are denoted by 411 to 416; the plurality of DUs are denoted by 311 to 312; and the plurality of CUs are classified into two groups, where one group of CUs is denoted by 111 to 112, the other group of CUs is denoted by 211 to 212, and each group of CUs includes a user layer (CU-U) and a control layer (CU-C). Each RF may have one or more corresponding DUs, and the DU may configure each cell corresponding to all RFs associated with this DU. Cells configured under a same DU are called a system area, such as a system area 1 (Sys area1) and a system area (Sys area2) shown in FIG. 2. The DU is responsible for processing wireless transmission and reception in the system area configured by the DU. In the system area, DU instances are also responsible for controlling wave velocity formation, power, frequency spectrum, scheduling and real-time RRM. A number of DU instances may be connected to one CU-U instance. Therefore, one CU-U instance may correspond to a plurality of DUs, that is, it is responsible for data reception and transmission of users in a plurality of system areas. The CU-U acts as an endpoint of an NG-U interface, and a user may move freely in cells contained in the CU-U without NG or Xn switching. Each CU-C instance may process a number of DU instances. Thus, the CU-C may consider the whole area as a same area. In this structure, by coordinating all available RRM functions, the collaborative efficiency of RRM and the spectral efficiency of a same system area can be improved.

In the CU/DU architecture shown in FIG. 2, the CU may be divided into a control plane (CP) and a user plane (UP), which correspond to generated CU-C instances and CU-C instances. One CU-U instance corresponds to a plurality of DUs, and can realize the data distribution of the user plane so as to balance the load. One DU corresponds to a plurality of CU-C instances, and can realize the data distribution of the control plane so as to balance the load. In the architecture diagram shown in FIG. 3, one DU may be connected to one or more CUs. For example, the DU2 denoted by 63 is connected to the CU2 denoted by 52. One group of CUs (at least two CUs) (e.g., CU1 and CU2) is connected to a 5G core network denoted by 41, respectively. Signaling parameters and data may be transmitted between the 5G core network and the CUs through interfaces between the CUs and the 5G core network. One CU may also be connected to one or more DUs. For example, the CU is connected to a plurality of DUs denoted by 61 to 62.

In the CU/DU architecture provided in the embodiments of the present application, the problems such as the load balancing problem can be solved when one CU corresponds to a plurality of DUs and one DU may also correspond to a plurality CUs. Without increasing the cost, when an accessed source CU in a plurality of CUs corresponding to one DU has a high load, the DU may be migrated from the source CU with a high load to another CU accessed by the DU, that is, the DU may be migrated from the source CU with a high load to a target CU with a low load, so that the problem of high load of the CU is solved. In addition to load balancing, the CU/DU architecture provided in the embodiments of the present application is also suitable for scenarios such as cell setup (or activation), deletion (or deactivation) and cell smooth upgrading.

Figure 4:
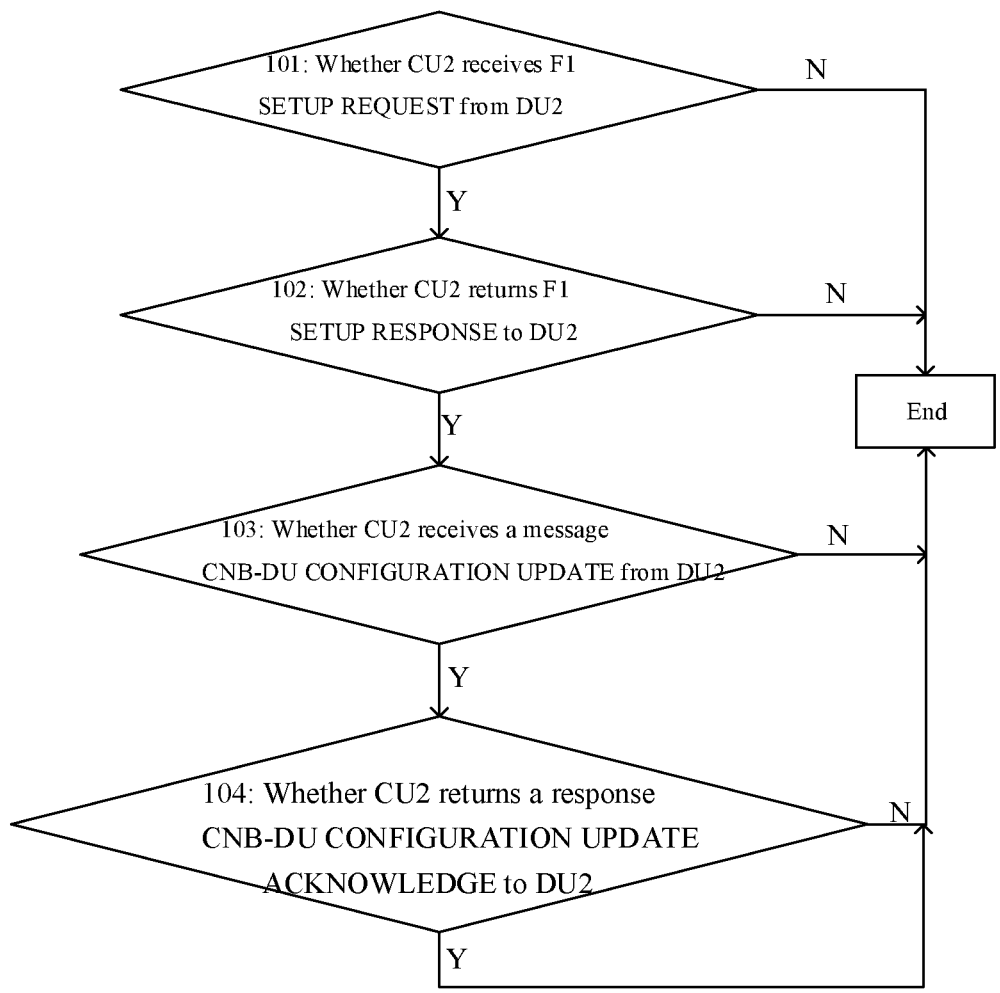
FIG. 4 is a flowchart of cell activation (or setup) according to an embodiment of the present application.

The cell setup (or activation) process is shown in FIG. 4. By taking the connection between DU2 and CU2 as an example, the process includes the following steps.

At Step 101, DU2 sends an F1 interface setup request (F1 SETUP REQUEST) to CU2; it is determined whether CU2 has received the F1 SETUP REQUEST; if CU2 has received the F1 SETUP REQUEST, a step 102 will be executed; or otherwise, the process ends.

At Step 102, it is determined whether CU2 sends an F1 interface setup response (F1 SETUP RESPONSE) to DU2; if CU2 sends the F1 SETUP RESPONSE to DU2, a step 103 will be executed; or otherwise, the process ends. Upon receiving the F1 SETUP RESPONSE from CU2, DU2 acquires load information of CUs, so as to decide whether to balance the load according to the load information of CUs and the load threshold.

At Step 103, DU2 requests CU2 to activate (or set up) a cell (GNB-DU CONFIGURATION UPDATE). It is determined whether CU2 has received the GNB-DU CONFIGURATION UPDATE; if CU2 has received the GNB-DU CONFIGURATION UPDATE, a step 104 will be executed; or otherwise, the process ends.

At Step 104, it is determined whether CU2 sends a cell activation (or setup) result (GNB-DU CONFIGURATION UPDATE ACKNOWLEDGE) to DU2; if CU2 sends the GNB-DU CONFIGURATION UPDATE ACKNOWLEDGE to DU2, the process ends; and, upon receiving the GNB-DU CONFIGURATION UPDATE ACKNOWLEDGE from CU2, DU2 allocates cell resources and activates (or sets up) a cell.

Figure 5:
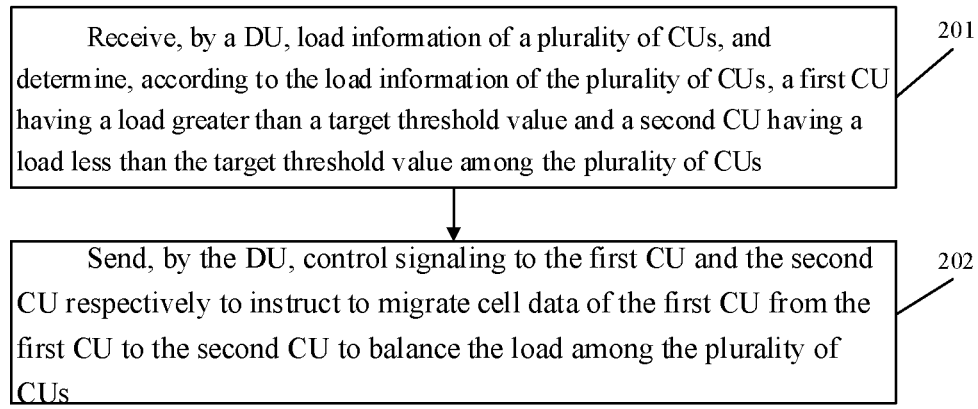
FIG. 5 is a flowchart of a method according to an embodiment of the present application.

FIG. 5 is a flowchart of an information processing method in a baseband processing split architecture according to an embodiment of the present application. The method includes the following steps.

At Step 201, a DU receives load information of a plurality of CUs, and determines, according to the load information of the plurality of CUs, a first CU having a load greater than a target threshold value and a second CU having a load less than the target threshold value among the plurality of CUs.

The target threshold value may be preset according to the empirical value, or may be a value that is calculated according to the actual situation and then designated to the DU.

At Step 202, the DU sends control signaling to the first CU and the second CU respectively to instruct to migrate cell data of the first CU from the first CU to the second CU to balance the load among the plurality of CUs.

In an embodiment, the first CU and the second CU are adjacent CUs, and both the first CU and the second CU are connected to the DU. If the load of the first CU is greater than the target threshold value, the first CU is in a high load state; and, if the load of the second CU is less than the target threshold value, the second CU is in a low load state. Considering the load balance among CUs, it is necessary to migrate the cell data of the first CU from the first CU to the second CU. Unlike the existing technology, in this embodiment of the present application, to balance the load among a plurality of CUs, the cell data (not users) will be migrated, and load balancing is carried out between adjacent CUs by using cell as granularity. Specifically, the DU sends the control signaling to the first CU to inform the first CU of deleting m cells, and the first CU returns a response to inform the DU that m cells have been deleted. The DU sends the control signaling to the second CU to inform the second CU of adding m cells, the second CU returns a response to inform the DU that m cells have been newly added, and users may continuously access to the m newly added cells.

This embodiment of the present application is applicable to two scenarios where there is data only on the first CU in the two CUs (the first CU and the second CU) and there is data on both the first CU and the second CU. The migration of the cell data is instructed by the control signaling. For example, when the migration is performed by using 5 cells as granularity, the first CU has 20 cells, the second CU has 5 cells, and 5 cells are migrated to the second CU. There is no effect on the existing cells on the second CU, but the first CU will be affected (the first CU lacks five cells, so that the load is reduced), and there become 10 cells on the second CU.

The load information of CUs may be directly designated to the DU, or may be fed back to the DU after the DU initiates a request. Specifically, the situation of directly indicating the load information of CUs is as follows: before the DU receives the load information of the plurality of CUs, the DU receives load indication information fed back by the plurality of CUs, and the load information of CUs is contained in the load indication information contains. One situation of feeding back the load information of CUs after a request is initiated is as follows: before the DU receives the load information of the plurality of CUs, the DU initiates a request and then receives load indication information fed back by the plurality of CUs, and the load information of CUs is contained in the load indication information. Another situation of feeding back the load information of CUs after a request is initiated is as follows: before the DU receives the load information of the plurality of CUs, the DU sends a load request message to the plurality of CUs, the DU receives a load response message fed back by the plurality of CUs, and the load information of CUs is contained in the load response message.

In the two scenarios where there is data only on the first CU in the two CUs (the first CU and the second CU) and there is data on both the first CU and the second CU, migrating the cell data of the first CU from the first CU to the second CU comprises two situations: directly migrating data when there is data only on the first CU but there is no data on the second CU, and updating and then migrating data when there is data on both the first CU and the second CU.

In an embodiment, migrating the cell data of the first CU from the first CU to the second CU comprises: when the DU merely performs data transmission with the first CU, directly migrating the cell data of the first CU from the first CU to the second CU.

In another embodiment, migrating the cell data of the first CU from the first CU to the second CU comprises: when the DU performs data transmission with both the first CU and the second CU, migrating the cell data of the first CU from the first CU to the second CU after the data transmission of the second CU is updated.

In practical applications, the cell data of the first CU may be completely or partially migrated. The complete migration means that all cells in the cell data of the first CU are migrated to the second CU. For example, when there are 10 cells under the first CU and if the first CU is in a high load state currently, the 10 cells may be migrated to the second CU. If there are 5 cells under the second CU currently, there will be 15 cells under the second CU after the cell data migration. The partial migration means that some specified cells in the cell data of the first CU are migrated to the second CU. For example, when there are 10 cells under the first CU and if the first CU is in a high load state currently, 5 cells may be migrated to the second CU. If there are 5 cells under the second CU currently, there will be 10 cells under the second CU after the cell data migration.

In an embodiment, the determining, by the DU and according to the load information of the plurality of CUs, a first CU having a load greater than a target threshold value and a second CU having a load less than the target threshold value among the plurality of CUs further comprises: if the load information of the first CU in the load information of the plurality of CUs is greater than or equal to a first load threshold that is used for representing a load value greater than the target threshold value in a load state, determining that the first CU is in a high load state. If the load information of the second CU in the load information of the plurality of CUs is less than a second load threshold that is used for representing a load value less than the target threshold value in the load state, it is determined that the second CU is in a low load state. An operation of sending, by the DU, control signaling to the first CU and the second CU respectively is triggered to instruct to migrate cell data of the first CU from the first CU to the second CU to balance the load among the plurality of CUs.

In an embodiment, an average load of CUs is obtained according to at least one of the following: the percentage of the UE number of CUs in the total UE number, CPU occupancy, memory occupancy, storage occupancy, bandwidth occupancy, UE number weight of the DU, CPU occupancy weight, memory occupancy weight, storage index weight and bandwidth weight. According to the average load of CUs, it is determined whether to balance the load among the plurality of CUs. If it is determined to balance the load among the plurality of CUs, an operation of sending, by the DU, control signaling to the first CU and the second CU respectively is triggered to migrate cell data of the first CU from the first CU to the second CU to balance the load among the plurality of CUs.

In an embodiment, after the cell data of the first CU is migrated from the first CU to the second CU, the DU instructs the second CU to access a new user in a new cell obtained after migration. The new user is a user who does not access the first CU and the second CU previously. When there is no accessed stock user on the first CU (the stock user is a user who is connected to the CU before the data migration), the DU determines that the migration of the cell data on the first CU is completed, and the DU notifies the first CU to synchronously update the cell data. This embodiment is applicable to the smooth upgrading scenario.

Specifically, all or some of the new cells migrated from the first CU are activated on the second CU for the purpose of allowing users to access the cells. New users access the activated new cells. When there is no accessed stock user on the first CU, the first CU is upgraded, and the DU notifies the first CU to synchronously update cell data to upgrade the first CU. For example, 5 cells are migrated from the first CU to the second CU, ensuring that new users access the second CU, for example, new users access the 5 cells. The new users cannot access the CU1 in order to upgrade the first CU, so that no user is accessed.

In an embodiment, before the information processing method in a baseband processing split architecture according to the embodiment of the present application is executed, the following CU configuration parameters and DU configuration parameters are read during power-on, so that the operating environment of the information processing method is constructed according to the CU configuration parameters and DU configuration parameters. The use of the CU configuration parameters and DU configuration parameters is the initial stage of executing the process of the information processing method and the prerequisite for executing the process of the information processing method. Without these configuration parameters, it is impossible to establish a connection between the DU and the plurality of CUs, and data transmission may be performed only after the link is established. For example, the configuration parameter is a balancing switch configuration for dynamic cells. It can be understood that a certain CU supports load balance scheduling, and if so, the process of this method may be executed only after this switch configuration is turned on. For example, the configuration parameters are priority configuration parameters of CUs. Since there are a plurality of CUs connected to the DU, it is necessary to determine according to the priority configuration parameters of the CUs whether the DU preferentially establishes a link with which CU. After the parameters are configured, it can be known which CUs are near the DU and that the DU may be linked with which CUs.

The CU configuration parameters include at least one of the balancing switch configuration for dynamic cells, the balancing trigger mode configuration for CU dynamic cells, the load trigger mode configuration of the F1 interface message and the balancing period configuration for CU dynamic cells.

The balancing switch configuration for dynamic cells is a prerequisite for load balancing, and a CU reads the balancing switch configuration for dynamic cells and then turns on the load balancing switch to realize load balancing. The process of this method may be executed only after the switch configuration is turned on.

The balancing trigger mode configuration for CU dynamic cells includes, but not limited to, periodic triggering and event triggering. No matter in which triggering mode, it is necessary to determine whether to turn on the load balancing switch according to the balancing switch configuration for dynamic cells. If the load balancing switch is turned on, the process of this method will be executed; and, if the load balancing switch is turned off, the process of this method ends.

The load trigger mode configuration of the F1 interface message includes two situations: the CU actively sends a load indication message (CU LOAD INFORMATION INDICATION) to the DU; and the CU replies a load response message (CU LOAD INFORMATION RESPONSE) to the DU upon receiving the load request message (CU LOAD INFORMATION REQUEST). In the case of active transmission (the CU actively sends the CU LOAD INFORMATION INDICATION to the DU), the CU LOAD INFORMATION INDICATION is sent to the DU according to the balancing trigger mode configuration for CU dynamic cells (including but not limited to periodic triggering and event triggering), and the DU performs load balancing by comparing the load information of CUs carried in the CU LOAD INFORMATION INDICATION with the target threshold value.

For the balancing period configuration for CU dynamic cells, this configuration is valid when the load trigger mode configuration of the F1 interface message is that the CU actively sends CU LOAD INFORMATION INDICATION to the DU.

In an example of the configuration parameters, when the balancing trigger mode configuration for CU dynamic cells is event triggering:

I. When a UE is accessed, it is determined according to the balancing switch configuration for dynamic cells that the load balancing switch is turned on; if the switch is turned on, in accordance with the load trigger mode configuration of the F1 interface message (that is, the CU actively sends the CU LOAD INFORMATION INDICATION to the DU), the CU actively sends the message CU LOAD INFORMATION INDICATION to the DU.

II. When a UE is accessed, it is determined according to the balancing switch configuration for dynamic cells that the load balancing switch is turned on; and, if the switch is turned off, the process ends.

III. When a UE is accessed, it is determined according to the balancing switch configuration for dynamic cells that the load balancing switch is turned on; if the switch is turned on, in accordance with the load trigger mode configuration of the F1 interface message (that is, the CU replies a response message CU LOAD INFORMATION RESPONSE to the DU upon receiving the message CU LOAD INFORMATION REQUEST), the process ends.

In an example of the configuration parameters, when the balancing trigger mode configuration for CU dynamic cells is periodic triggering:

I. During power-on, a periodic timer is started. When the period timer expires, it is determined according to the balancing switch configuration for dynamic cells that the load balancing switch is turned on; if the switch is turned on, in accordance with the load trigger mode configuration of the F1 interface message (that is, the CU actively sends the CU LOAD INFORMATION INDICATION to the DU), the CU actively sends the message CU LOAD INFORMATION INDICATION to the DU.

II. During power-on, a periodic timer is started. When the period timer expires, it is determined according to the balancing switch configuration for dynamic cells that the load balancing switch is turned on; and, if the switch is turned off, the process ends.

III. During power-on, a periodic timer is started. When the period timer expires, it is determined according to the balancing switch configuration for dynamic cells that the load balancing switch is turned on; if the switch is turned on, in accordance with the load trigger mode configuration of the F1 interface message (that is, the CU replies a response message CU LOAD INFORMATION RESPONSE to the DU upon receiving the message CU LOAD INFORMATION REQUEST), the process ends.

The DU configuration parameters include at least one of a balancing switch configuration parameter for DU dynamic cells, a CU configuration parameter corresponding to the DU, a balancing trigger mode configuration parameter for DU dynamic cells, a balancing period configuration parameter for DU dynamic cells, a balancing trigger mode configuration parameter of the F1 interface message, a CU load information response sending mode configuration, a weight configuration, high-load and low-load threshold configuration of CUs, and a priority configuration parameter for CUs corresponding to the DU.

The balancing switch configuration parameter for DU dynamic cells is a prerequisite for load balancing, and the DU reads the balancing switch configuration for dynamic cells and then turns on the load balancing switch to realize load balancing. The process of this method may be executed only after the switch configuration is turned on.

For the CU configuration parameter corresponding to the DU, load balancing may be performed only after each DU is connected to a plurality of CUs according to the CU configuration parameter corresponding to the DU. The process of this method may be performed only after this configuration is executed.

For the priority configuration parameter for CUs corresponding to the DU, the DU makes a decision according to the priority configuration parameter upon receiving the CU LOAD INFORMATION RESPONSE or the CU LOAD INFORMATION INDICATION sent to the DU. If a plurality of CUs meet the load balancing condition, it is necessary to select the most appropriate group of adjacent CUs for load balancing according to the priority configuration parameter. For example, if CU1 and CU2 among a plurality of CUs (CU1, CU2, CU3 and CU4) have high priority and CU1 and CU2 are adjacent CUs, the DU preferentially performs load balancing scheduling on CU1 and CU2.

The parameter weight configuration for average load calculation includes, but not limited to, UE number weight, CPU occupancy weight, memory occupancy weight, storage index weight, bandwidth weight or the like. Upon receiving the CU LOAD INFORMATION RESPONSE or the CU LOAD INFORMATION INDICATION sent to the DU, the DU calculates an average load according to the weight configuration, so as to determine, according to the average load, whether to balance the load among the plurality of CUs.

The balancing trigger mode configuration parameter for DU dynamic cells includes, but not limited to, periodic triggering and event triggering. The configuration parameter is used for indicating a mode in which the DU sends the CU LOAD INFORMATION REQUEST to CUs.

For the balancing period configuration parameter for DU dynamic cells, if the balancing trigger mode configuration parameter for DU dynamic cells is periodic triggering, this configuration parameter is required to determine the period, and the DU is instructed to send the CU LOAD INFORMATION REQUEST to CUs according to the period.

For the balancing trigger mode configuration parameter of the F1 interface message, it is determined according to the balancing trigger mode configuration parameter of the F1 interface message whether the DU passively waits for the CU LOAD INFORMATION INDICATION sent by CUs or the DU actively sends the message CU LOAD INFORMATION REQUEST to CUs. This triggering mode configuration parameter must be matched with the corresponding configuration parameter on the CU side. If the triggering mode configuration parameter is that the DU passively waits for the CU LOAD INFORMATION INDICATION sent by CUs, the DU does not actively perform load balancing; or otherwise, the DU actively sends the message CU LOAD INFORMATION REQUEST to CUs.

For the high-load and low-load threshold configuration of CUs, upon receiving the CU LOAD INFORMATION RESPONSE or the CU LOAD INFORMATION INDICATION sent to the DU, the DU obtains the load information of CUs, and determines whether to perform load balancing according to the comparison of the load information of CUs with the threshold.

The CU load information response sending mode configuration includes, but not limited to, periodic and event. If this configuration is an event, one message CU LOAD INFORMATION RESPONSE will be received for one message CU LOAD INFORMATION REQUEST; or otherwise, multiple messages CU LOAD INFORMATION RESPONSE will be received for one CU LOAD INFORMATION REQUEST.

In an embodiment, in a scenario where the CU passively initiates a request, the second DU is connected to the first CU and the second CU among a plurality of CUs; the first CU receives a first load request message sent by the second DU and sends, to the second DU, a first load response message carrying the load information of the first CU; and, the second CU receives a second load request message sent by the second DU and sends, to the second DU, a second load response message carrying the load information of the second CU. When it is found according to the load information of the first CU and the load information of the second CU that there is a CU high load state currently, the first CU and the second CU accept the scheduling of the second DU, and the cell data of the first CU is migrated from the first CU to the second CU to balance the load among a plurality of CUs.

Herein, the information carried in the load response message may include CU load values. The load response message may carry a CU load value, that is, a CU carries the load of this CU. The load response message may also carry a plurality of CU load values, and this will not repeated here.

In an embodiment, in a scenario where the CU actively initiates a request, the second DU is connected to a first CU and a second CU among a plurality of CUs; the first CU sends a first load indication message to the second DU, where the first load indication message carries the load information of the first CU; and, the second CU sends a second load indication message to the second DU, where the second load indication message carries the load information of the second CU. When it is found according to the load information of the first CU and the load information of the second CU that there is a CU high load state currently, the first CU and the second CU accept the scheduling of the second DU, and the cell data of the first CU is migrated from the first CU to the second CU to balance the load among a plurality of CUs.

Figure 1:
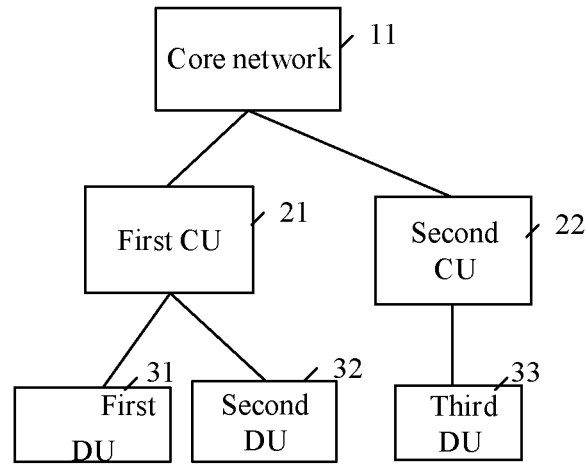
FIG. 1 is a diagram of a CU/DU architecture.

In the CU/DU architecture shown in FIG. 1, one CU corresponds to a plurality of DUs, while one DU corresponds to only one CU. A CU may be divided into a CP and a UP. For the UP, the existing protocol has realized an architecture in which one DU may correspond to a plurality of CU-Ups. This architecture realizes the data distribution of the user plane. For the CP, if the CU-CP architecture in which one DU corresponds to only one CU is still used (as shown in FIG. 1, the third DU33 may only correspond to the CP of the second CU22), there are at least the following problems in the signaling transmission of the control plane:

1. There is a tidal effect in the hotspot area CU-CP, and a high-traffic point in time will lead to a high load of the CU-CP, and the high load leads to the serious reduction in access success rate, handover success rate and call drop rate, thereby bringing a great trouble to the user perception and the operation and maintenance of the operator.

2. For the hotpot area CU-CP, a low-traffic point in time will lead to a low load of the CU-CP, resulting in resource waste.

3. The virtualization technology is also provided in 5G. Although the virtualization technology in 5G has solved the resource waste problem, it is limited to the resources of a single CU-CP, and the high load problem of resources of the CU-CP is not solved fundamentally.

If the scheme for the high load of the CU-CP adopts a capacity expansions mechanism, the cost will be increased. According to the embodiment of the present application for the CP, a CU-CP architecture in which one DU corresponds to at least one group of CUs is used. At this time, one CU corresponds to a plurality of DUs, and one DU corresponds to a plurality of CUs. The DU may dynamically select a scheme for the CU-CP according to the resources, so that the high load problem of the CU-CP is solved without increasing the cost.

Specifically, in the current situation, for the CP, since one DU corresponds to one CU, although the deployed CU may scale flexibly, the flexible scalability of the CU is limited by the hardware resources. If the hardware resources on the CU side are insufficient and need to be expanded, and when the resources popped up by the CU reach a certain degree, the performance such as CPU occupancy of the system will be greatly affected. However, according to the embodiment of the present application, the system will not be limited by the hardware resources on the CU side, and the utilization of resources on the CU side may be rationally adjusted, so that the overall network performance is improved. A DU may be provided to dynamically balance the load among CUs during the operating process so as to deploy CUs in an optimal way, and the principles of high reliability, low delay and load sharing are met as far as possible. Accordingly, better experience can be realized for users, the call drop rate can be reduced, and the communication quality can be improved.

Figure 3:
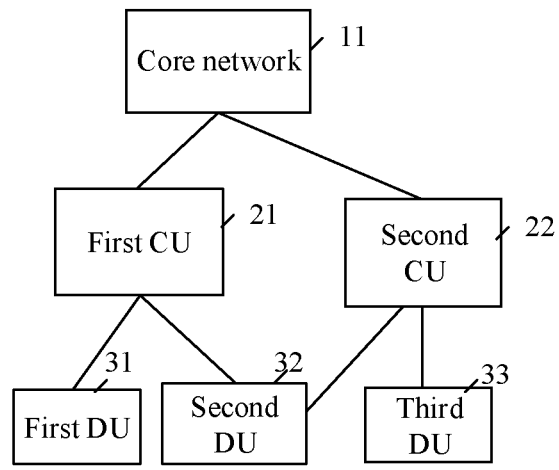
FIG. 3 is a diagram of a CU/DU architecture according to an embodiment of the present application.

When one DU corresponds to a plurality of CUs (that is, a CU is configured with adjacent CUs), in an example of performing load balancing among adjacent CUs by using cell as granularity, if there is at least one CU with a high load (busy) and at least one CU with a low load (idle) among the CUs corresponding to the DU, idle cells in the cell with a high load may be balanced to the CU with a low load, as shown in FIG. 3. In FIG. 3, if it is assumed that the first CU21 corresponding to the second DU32 has a high load and the second CU22 corresponding to the second DU32 has a low load, load balancing is performed among CUs according to the embodiment of the present application (the migration granularity is cell), and some or all of inactivated (or idle) cells under the first CU21 corresponding to the second DU32 may be balanced to the second CU22, that is, load balancing may be performed among adjacent CUs by using cell as granularity.

Figure 6:
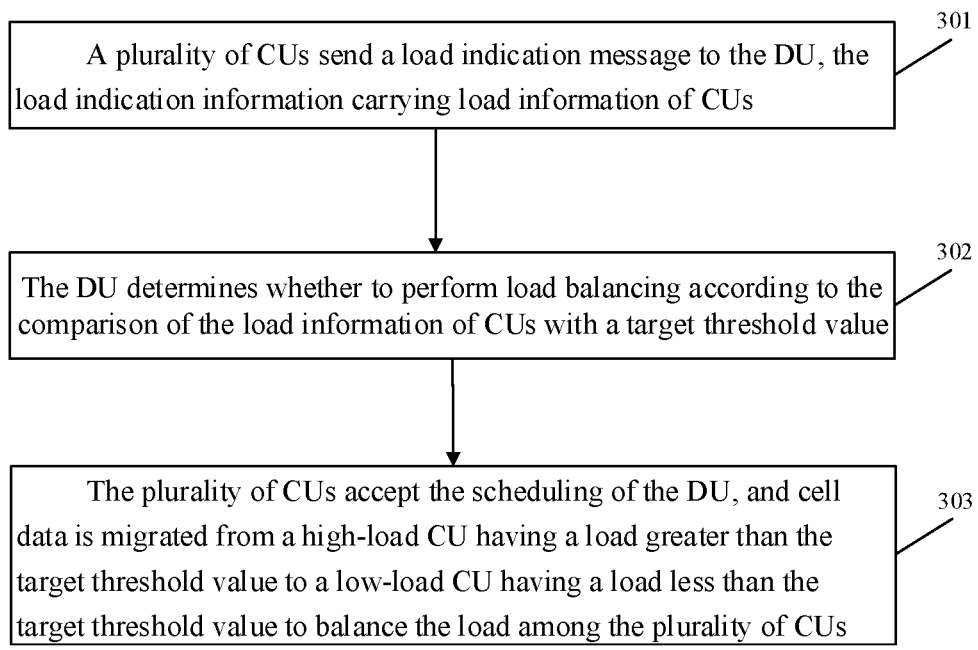
FIG. 6 is a flowchart of another method according to an embodiment of the present application.

When the information processing method in a baseband processing split architecture provided in the embodiment of the present application is applied to a situation where one CU corresponds to a plurality of DUs and one DU corresponds to a plurality of CUs, as shown in FIG. 6, the method includes the following steps.

At Step 301, a plurality of CUs send a load indication message to a DU, the load indication message carrying load information of CUs.

At Step 302, the DU determines whether to perform load balancing according to the comparison of the load information of CUs with a target threshold value.

At Step 303, the plurality of CUs accept the scheduling of the DU, and cells data is migrated from a high-load CU having a load greater than the target threshold value to a low-load CU having a load less than the target threshold value to balance the load among the plurality of CUs.

In an embodiment, the method further include: according to an average load of CUs, it is determined whether to balance the load among the plurality of CUs (for example, making a decision by comparing the average load with the load threshold). If it is determined to balance the load among the plurality of CUs, an operation of transmitting, by the DU, control signaling to the first CU and the second CU respectively is triggered to instruct to migrate cell data of the first CU from the first CU to the second CU to balance the load among the plurality of CUs.

The average load is calculated in the following way.

I. The percentage of the UE number of CUs in the total UE number is acquired, and the CPU occupancy, memory occupancy, storage occupancy and bandwidth occupancy are acquired.

II. The UE number weight of the DU, CPU occupancy weight, memory occupancy weight, storage index weight and bandwidth weight configured in the background are acquired.

III. The average load is calculated by the following formula:

the average load=(the UE number weight of the DU*the percentage of the UE number of CUs in the total UE number+the CPU occupancy weight*the CPU occupancy+ the memory occupancy weight*the memory occupancy+the storage index weight*the storage occupancy+the bandwidth weight*the bandwidth occupancy)*100

The information processing device in a baseband processing split architecture provided in the embodiments of the present application is used to perform the above embodiments and optional implementations, and will not be repeated herein. As used hereinafter, the term "module" may be a combination of software and/or hardware that performs predetermined functions. Although the device described in the following embodiments is preferably performed by software, it is possible and contemplated to perform the device by hardware or the combination of software and hardware.

Figure 7:
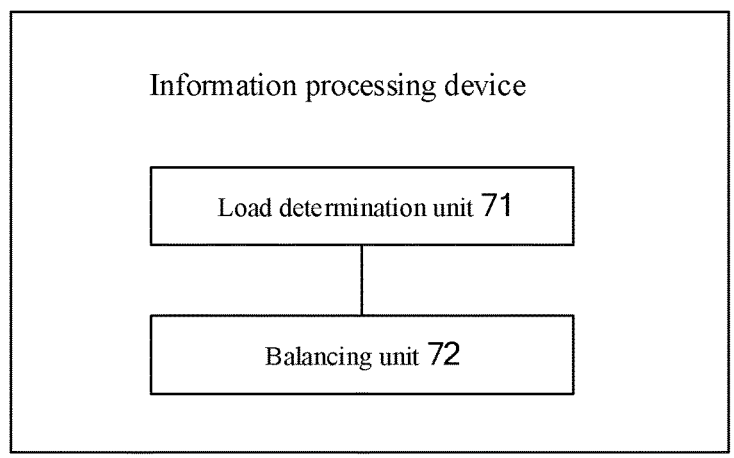
FIG. 7 is a structure diagram of constitutional units of a device according to an embodiment of the present application.

An embodiment of the present application provides an information processing device in a baseband processing split architecture. As shown in FIG. 7, the device includes: a load determination unit 71 configured to receive load information of a plurality of central units (CUs), and determine, according to the load information of the plurality of CUs, a first CU having a load greater than a target threshold value and a second CU having a load less than the target threshold value among the plurality of CUs; and a balancing unit 72 configured to send control signaling to the first CU and the second CU respectively to instruct to migrate cell data of the first CU from the first CU to the second CU to balance the load among the plurality of CUs.

In an embodiment, the device further includes: a receiving unit configured to receive load indication information fed back by the plurality of CUs, the load indication information containing load information of the CUs.

In an embodiment, the balancing unit is further configured to: directly migrate cell data of the first CU from the first CU to the second CU in response to the DU merely performing data transmission with the first CU.

In an embodiment, the balancing unit is further configured to: migrate cell data of the first CU from the first CU to the second CU after the data transmission of the second CU is updated, in response to the DU performing data transmission with both the first CU and the second CU.

In an embodiment, the load determination unit is further configured to: determine that the first CU is in a high load state, if the load information of the first CU in the load information of the plurality of CUs is greater than or equal to a first load threshold that is used for representing a load value greater than the target threshold value in a load state; determine that the second CU is in a low load state, if the load information of the second CU in the load information of the plurality of CUs is less than a second load threshold that is used for representing a load value less than the target threshold value in the load state; and, trigger an operation of respectively sending control signaling to the first CU and the second CU.

In an embodiment, the device further includes: an average load calculation unit configured to obtain an average load of CUs according to at least one of the following: the percentage of the UE number of CUs in the total UE number, CPU occupancy, memory occupancy, storage occupancy, bandwidth occupancy, UE number weight of the DU, CPU occupancy weight, memory occupancy weight, storage index weight and bandwidth weight; and a load balancing decision unit configured to determine, according to the average load of CUs, whether to balance the load among the plurality of CUs.

In an embodiment, the device further includes: an instruction unit configured to instruct the second CU to access a new user in a new cell obtained after migration; and an update notification unit configured to: when there is no accessed stock user on the first CU, determine that the migration of the cell data on the first CU is completed, and notify the first CU to synchronously update the cell data.

An embodiment of the present application provides a device for dynamically selecting the CU(s). The device includes: a memory stored with a computer program; and, a processor configured to perform the steps of the method described in any one of the above embodiments when executing the computer program.

Figure 8:
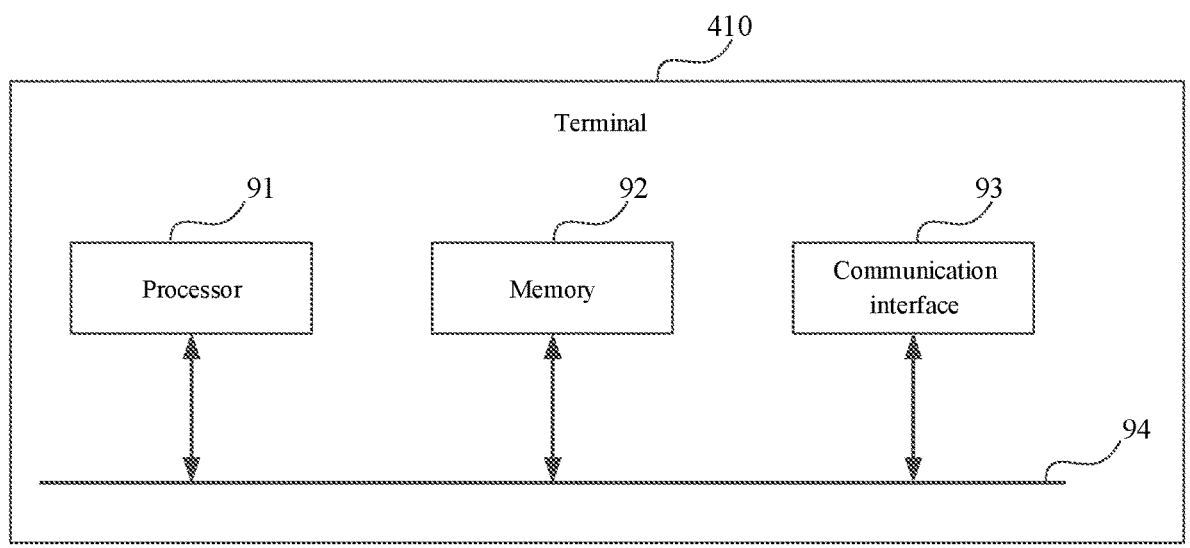
FIG. 8 is a structure diagram of the hardware composition of a device according to an embodiment of the present application.
Figure 9:
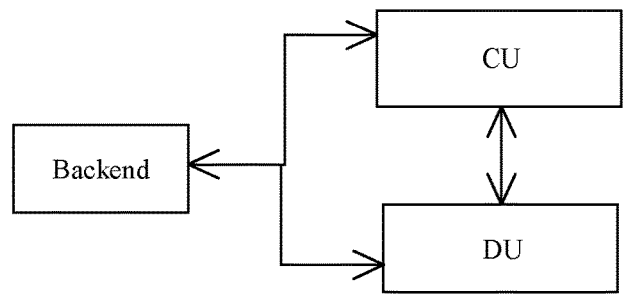
FIG. 9 is a block diagram of the implementation of a CU/DU architecture according to an embodiment of the present application.

An embodiment of the present application provides a device for dynamically selecting the CU(s). As shown in FIG. 8, the device 410 includes: a processor 91 and a memory 92 configured to store a computer program that may run on the processor. Of course, in practical applications, as shown in FIG. 9, the device 410 may further include at least one communication interface 93. The components in the device 410 are coupled together by a bus system 94. It should be understood that the bus system 94 is used to realize the communication among these components. In addition to a data bus, the bus system 94 further includes a power bus, a control bus and a state signal bus. However, for clarity, in FIG. 9, various buses are labeled as the bus system 94. The communication interface 93 is used to interact with other devices.

It should be understood that the memory 92 may be a volatile memory or a non-volatile memory or may include volatile and non-volatile memories. The non-volatile memory may be read only memories (ROMs), programmable read-only memories (PROMs), erasable programmable read-only memories (EPROMs), electrically erasable programmable read-only memories (EEPROMs), ferromagnetic random access memories (FRAMs), flash memories, magnetic surface memories, optical disks or compact disc read-only memories (CD-ROMs). The magnetic surface memories may be magnetic disk memories or magnetic tape memories. The volatile memory may be random access memories (RAMs), and acts as an external cache. Exemplary but not limiting, RAMs in various forms are available, such as static random access memories (SRAMs), synchronous static random access memories (SSRAMs), dynamic random access memories (DRAMs), synchronous dynamic random access memories (SDRAMs), double data rate synchronous dynamic random access memories (DDRSDRAMs), enhanced synchronous dynamic random access memories (ESDRAMs), SyncLink dynamic random access memories (SLDRAMs) and direct Rambus random access memories (DRRAMs). The memory 42 described in the embodiment of the present application is intended to include, but not limited to, these memories and any other suitable types of memories.

An embodiment of the present application further provides a computer-readable storage medium used for storing a computer program provided in the above embodiments so as to perform the steps in the method described above. The computer-readable storage medium may be a memory, such as an FRAM, an ROM, a PROM, an EPROM, an EEPROM, a flash memory, a magnetic surface memory, an optical disk or a CD-ROM; or may be various devices including one of the memories or any combination of the memories.

It is to be noted that the technical schemes recorded in the embodiments of the present application may be combined arbitrarily if not conflicted.

Optional embodiments of the present application will be described below in detail with reference to the accompanying drawings.

Herein, the CU specifically refers to a CU-CP; and in this embodiment, the scheme of dynamically selecting CUs by the DU according to resources is specific to the technology of dynamically selecting CU-CPs by the DU in a case where one DU corresponds to a plurality of CU-CPs. As shown in FIG. 3, if the second DU32 is hung under both the first CU21 and the second CU22, the first CU21 and the second CU22 are adjacent CUs. The adjacency relationship between CUs is determined by configuration, and configuring adjacent CUs is the basis of the cell dynamic balancing scheme. If the second DU32 is hung under both the first CU21 and the second CU22, a plurality of CUs and the DU are cross-connected. When the first CU21 is in a high load state and the second CU22 is in a low load state, the first CU21 may be used as a source CU, and the second CU22 may be used as a target CU, so that cell data is migrated from the source CU to the target CU. In the following description, the first CU is denoted by CU1, the second CU is denoted by CU2 and the second DU is denoted by DU2.

If it is assumed that the CU1 corresponding to DU2 has a high load (busy) and the CU2 corresponding to DU2 has a low load (idle), by using the process of this method, some or all of inactivated (or idle) cells under CU1 in DU2 may be balanced to CU2, that is, load balancing may be performed between adjacent cells by using cell as granularity.

The cell activation (or setup) process based on the new CU-CP architecture in FIG. 3 is shown in FIG. 4. The process has been described above by way of example and will not be repeated here.

This scheme adopts (but not limited to) the following devices or apparatuses, as shown in FIG. 9. The devices include: background, a CU and a DU. Wherein:

The background includes the following modules:

1) CU configuration module

Configuring a related parameter(s) required by the CU during the dynamic cell balancing process, the parameter(s) including but not limited to:

a balancing switch configuration parameter(s) for CU dynamic cells;

a basic configuration parameter for the CU;

a DU configuration parameter in the CU;

a weight configuration parameter for load calculation of the CU;

a balancing trigger mode configuration parameter for CU dynamic cells;

a balancing period configuration parameter for CU dynamic cells; and a load trigger mode configuration parameter of the F1 interface message.

2) DU configuration module

Configuring a related parameter(s) required by the DU during the dynamic cell balancing process, the parameter(s) including but not limited to:

a balancing switch configuration parameter(s) for DU dynamic cells;

a basic configuration parameter for the DU;

a configuration parameter for the second CU of the DU;

a priority configuration parameter for the second CU of the DU;

a balancing trigger mode configuration parameter for DU dynamic cells;

a balancing period configuration parameter for DU dynamic cells;

a load trigger mode configuration parameter of the F1 interface message;

a balancing timer configuration for DU dynamic cells; and a high-load and low-load threshold configuration for the CU.

As for the CU, the CU mainly processes the following four situations:

I. A load request message sent by the DU is received, and the trigger type is event-type.

(1) The CU receives a load request message sent by the DU, and acquires the type of the response message.

(2) The load value of the CU is calculated.

(3) The CU sends a load response message to the DU, and the load response message carries the load value.

II. A load request message sent by the DU is received, and the trigger type is periodic.

(1) The CU receives a load request message sent by the DU, and acquires the response type and period parameter in the load request message.

(2) The load value of the CU is calculated.

(3) The CU sends a load response message to the DU, and the load response message carries the load value.

(4) Every one period, (2) and (3) will be repeated.

III. A load indication message is sent to the DU, and the trigger type is periodic.

(1) The load value of the CU is calculated.

(2) A load response message is sent to the DU, and the load response message carries the load value.

(3) Every one period, (1) and (2) will be repeated.

IV. A cell configuration message from the DU is received.

(1) The cell activation (or setup) or deactivation (or deletion) process is executed, and a cell configuration response message is returned after the cell activation (or setup) or deactivation (or deletion) operation is completed.

As for the DU, the DU mainly processes the following three situations:

I. A load indication message from the CU is received.

(1) The load indication message from the CU is received, and the load value is stored.

(2) It is determined whether to perform cell balancing according to N groups of load values.

II. The DU actively sends a load request message of an event type to the CU.

(1) The DU actively sends the load request message to the CU.

(2) The DU receives a load response message, and the load response message carries the load value.

(3) It is determined whether to perform cell balancing according to the load value.

III. The DU actively sends a periodic load request message to the CU.

(1) The DU actively sends the load request message to the CU.

(2) The DU receives a load response message and stores the load value.

(3) The DU determines whether to perform cell balancing according to N groups of load values.

The DU also supports the smooth upgrading of CU-CP (the smooth upgrading function) and the scenario where a single cell is connected to a plurality of CUs.

The F1 interface message involved in this embodiment includes: 1. CU LOAD INFORMATION REQUEST; 2. CU LOAD INFORMATION RESPONSE; and, 3. CU LOAD INFORMATION INDICATION.

In a scenario having a plurality of CUs, the dynamic adaptive process (i.e., load balancing process) of the DU is realized.

In a scenario having a plurality of CUs, the configuration of the DU and CU-CPs is realized.

In a scenario having a plurality of CUs, the smooth upgrading process of CUs is realized.

The scenario where a single cell is connected to a plurality of CUs is supported (the connection of a single cell to a plurality of CU-CPs based on a user is supported).

As shown in FIG. 3, there are CU1 and CU2, there are DU1-1 and DU1-2 under the CU1, there is DU2 under the CU2, and there is DU2 under the CU1, where the DU2 is allowed to activate the dynamic cell balancing function. The event trigger time includes, but not limited to: the time when a UE is accessed or released, or the time when a cell is activated (or set up) or deactivated (or deleted). The periodic trigger time includes, but not limited to: the time when a UE is accessed or released, or the time when a cell is activated (or set up) or deactivated (or deleted).

I. Example one (F1 interface protocol message)

The involved protocol information (F1 interface message, is appointed in the following way, but this way is not a unique scheme).

In the process of acquiring the load of a CU-CP by the DU, the naming mode includes, but not limited to, the CU load information request (CU LOAD INFORMATION REQUEST).

This message is sent by the gNB-DU to transfer information for a TNL association.

Direction: DU→CU

TABLE 1

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| DU ID | M | INTEGER (0 ... $2^{32}$-1) | | The DU ID is independently configured from cell identifiers, i.e. no connection between DU ID and cell identifiers. | YES | reject |
| DU Name | O | | PrintableString (SIZE(1 ... 150, ... | | YES | ignore |
| triggerType | M | | See 4 below | | YES | reject |
| timeToTrigger | O | | See 5 below | | YES | ignore |
| Load Balance value Type | M | | See 6 below | | YES | reject |

The Period in IE/Group Name in Table 1 will be filled only when the Load Balance Mode is 2; 9.3.1.1 or the like in IE type and reference refers to Chapter 9.3.1.1 corresponding to 3GPP TS 38.473, similar for others.

In the CU-CP architecture, in the process of informing the DU of its load, the naming mode includes, but not limited to, the CU load information response (CU LOAD INFORMATION RESPONSE).

This message is sent by the gNB-CU to transfer information for a TNL association.

Direction: CU→DU

TABLE 2

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| Load value | M | | See 7 below | | YES | reject |

In the CU-CP architecture, in the process of actively informing the DU of its load, the naming mode includes, but not limited to, the CU load information indication (CU LOAD INFORMATION INDICATION).

This message is sent by the gNB-CU to transfer information for a TNL association.

Direction: CU→DU

TABLE 3

| IE/Group Name | Presence | Range | IE type and reference | Semantics description | Criticality | Assigned Criticality |
|---|---|---|---|---|---|---|
| Message Type | M | | 9.3.1.1 | | YES | reject |
| CU ID | M | | INTEGER (0 .. $2^{36}$-1) | The CU ID is independently configured from cell identifiers, i.e. no connection between CU ID and cell identifiers. | YES | reject |
| CU Name | O | | PrintableString(SIZE (1 . . . 150, . . . )) | | YES | ignore |
| Load Value | M | | See 6 below | | YES | reject | triggerType (load balance report type)
Describe the load balance report type.

TABLE 4

| IE/Group Name | Presence | Range | IE type and reference | Semantics description |
|---|---|---|---|---|
| triggerType | M | | ENUMERATED(0, 1) | 0: event; 1: periodical; | timeToTrigger
Time during which specific criteria for the event needs to be met in order to trigger a load balance report.

TABLE 5

| IE/Group Name | Presence | Range | IE type and reference | Semantics description |
|---|---|---|---|---|
| timeToTrigger | M | | INTEGER (0 . . . 100) s | |

Load Balance value Type
Indicate which load balance value type will be carried by the load balance report.

TABLE 6

| IE/Group Name | Presence | Range | IE type and reference | Semantics description |
|---|---|---|---|---|
| Load Balance value Type | M | | ENUMERATED(0-4) | 0: UE num Load, 1: CPU Load, 2: Memory load value, 3: Storage load value, 4: Bandwidth load value |

Load value
Load value information.

TABLE 7

| UE num Load Value | M | INTEGER (0 ... 100) | YES | reject |
|---|---|---|---|---|
| CPU Load value | M | INTEGER (0 ... 100) | YES | reject |
| Memory load value | M | INTEGER (0 ... 100) | YES | reject |
| Storage load value | M | INTEGER (0 ... 100) | YES | reject |
| Bandwidth load value | M | INTEGER (0 ... 100) | YES | reject |

Figure 10:
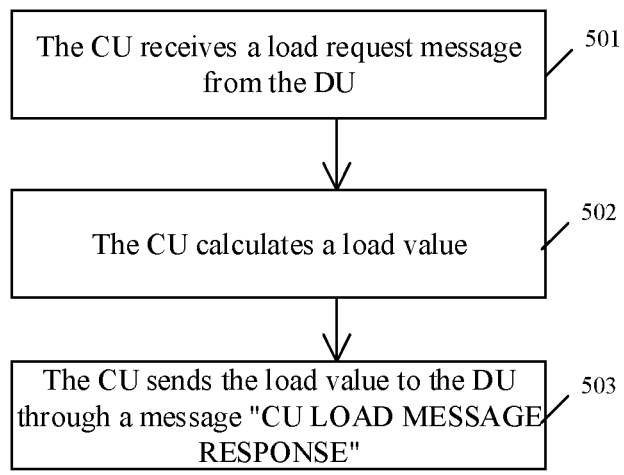
FIG. 10 is a flowchart of a first interaction process of the F1 interface protocol according to an embodiment of the present application.

Example two (first interaction process of the F1 interface protocol: the CU receives a load request message actively sent by the DU, and the CU periodically returns a load response message to the DU), as shown in FIG. 10, the following steps are included.

At Step 501, at the periodic trigger time, the DU sends a load request message, and the CU receives the load request message from the CU and stores the period of the load response message.

At Step 502, the CU calculates a load value, including but not limited to calculating the percentage of the UE number of the CU in the total UE number, and calculating the CPU occupancy, memory occupancy, storage occupancy and bandwidth occupancy.

At Step 503, the CU sends the load value to the DU through the message "CU LOAD INFORMATION RESPONSE".

The steps 502 to 503 will be repeated at regular intervals (the period length of the response message).

Figure 11:
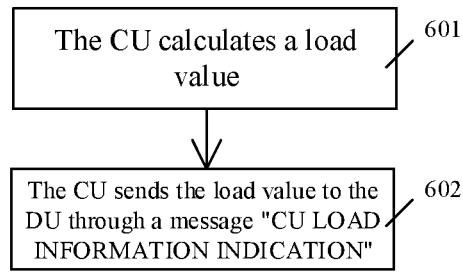
FIG. 11 is a flowchart of a second interaction process of the F1 interface protocol according to an embodiment of the present application.

Example three (second interaction process of the F1 interface protocol: the CU actively and periodically sends a load indication message), as shown in FIG. 11, the following steps are included.

At Step 601, at the periodic trigger time, the CU calculates a load value.

The calculation method includes, but not limited to, the following methods:

a) The percentage of the UE number of the CU in the total UE number is calculated, and the CPU occupancy, memory occupancy, storage occupancy and bandwidth occupancy are acquired.

b) The UE number weight of the DU, CPU occupancy weight, memory occupancy weight, storage index weight and bandwidth weight configured in the background are acquired.

c) the calculation formula is as follows: the load value= (the UE number weight of the DU*the percentage of the UE number of the CU in the total UE number+the CPU occupancy weight*the CPU occupancy+the memory occupancy weight*the memory occupancy+the storage index weight*the storage occupancy+the bandwidth weight*the bandwidth occupancy)*100.

At Step 602, the CU1 sends a message of "CU LOAD INFORMATION INDICATION" to the DU.

The steps 601 to 602 will be repeated by the CU at regular intervals (the balancing period configuration for CU dynamic cells configured in the background).

Example four (third interaction process of the F1 interface protocol: the CU receives a load request message actively sent by the DU, and the CU returns a load response message to the DU once), which includes.

1. At the event trigger time, the DU sends a load request message.

2. The CU receives the load request message from the DU.

3. The CU calculates a load value.

The calculation method includes, but not limited to, the following methods:

a) The percentage of the UE number of the CU in the total UE number is calculated, and the CPU occupancy, memory occupancy, storage occupancy and bandwidth occupancy are acquired.

b) The UE number weight of the DU, CPU occupancy weight, memory occupancy weight, storage index weight and bandwidth weight configured in the background are acquired.

c) the calculation formula is as follows: the load value= (the UE number weight of the DU*the percentage of the UE number of the CU in the total UE number+the CPU occupancy weight*the CPU occupancy+the memory occupancy weight*the memory occupancy+the storage index weight*the storage occupancy+the bandwidth weight*the bandwidth occupancy)*100.

4. The CU sends the load value to the DU through the message "CU LOAD INFORMATION RESPONSE".

Example five (fourth interaction process of the F1 interface protocol: the CU actively sends a load indication message once), which includes.

1. At the event trigger time, the CU calculates a load value. The calculation of the load value by the CU includes, but not limited to, calculation of the percentage of the UE number of the CU in the total UE number, and calculation of the CPU occupancy, memory occupancy, storage occupancy and bandwidth occupancy.

2. The CU1 sends a message "CU LOAD INFORMATION INDICATION" to the DU.

Example six (CU configuration process), which includes.

1. Configuration parameters are acquired, including but not limited to, the CU reading, from the configuration module, the balancing switch configuration for dynamic cells, CU configuration, DU configuration in the CU, balancing trigger mode configuration for CU dynamic cells (including but not limited to period triggering and event triggering), load trigger mode configuration of the F1 interface message (the CU actively sends CU LOAD INFORMATION INDICATION to the DU, or the CU returns the response message CU LOAD INFORMATION RESPONSE to the DU upon receiving the message CU LOAD INFORMATION REQUEST), and balancing period configuration for CU dynamic cells (this configuration is valid when the load trigger mode configuration of the F1 interface message is that the CU actively sends CU LOAD INFORMATION INDICATION to the DU).

2. The acquired configuration parameters are stored.

Example seven (DU configuration process), which includes.

1. Configuration parameters are acquired, including but not limited to the following configurations: the DU reads, from the configuration module, the balancing switch configuration parameter for DU dynamic cells, basic configuration parameter for the DU, CU configuration parameter corresponding to the DU, priority configuration parameter for CUs corresponding to the DU, parameter weight configuration for average load calculation (including but not limited to UE number weight, CPU occupancy weight, memory occupancy weight, storage index weight and bandwidth weight), balancing trigger mode configuration parameter for DU dynamic cells (including but not limited to periodic triggering and event triggering), balancing period configuration parameter for DU dynamic cells, balancing trigger mode configuration parameter of the F1 interface message (the DU passively waits for the message CU LOAD INFORMATION INDICATION from the CU, or the DU actively sends the message CU LOAD INFORMATION REQUEST to the CU), balancing timer configuration for DU dynamic cells, high-load and low-load threshold configuration of the CU, and CU load information response sending mode configuration (such as periodic or event).

2. The acquired configuration parameters are stored.

Example eight (storage process of the load value), which includes.

It is preset a cell balancing decision is made after N load response messages (or N load indication messages) are received. If the load process is an event, N=1; or otherwise, N is greater than or equal to 1.

1. It is determined whether DU2 receives the CU load information response from CU1 and CU2 within a particular time; and if not, the process ends.

2. The average load is calculated. The calculation method includes, but not limited to, the following methods:

The percentage of the UE number of CUs in the total UE number is acquired, and the CPU occupancy, memory occupancy, storage occupancy and bandwidth occupancy are acquired.

The UE number weight, CPU occupancy weight, memory occupancy weight, storage index weight and bandwidth weight configured in the background are acquired.

The calculation formula is as follows: the average load value=(the UE number weight of the DU*the percentage of the UE number of the CU in the total UE number+the CPU occupancy weight*the CPU occupancy+the memory occupancy weight*the memory occupancy+the storage index weight*the storage occupancy+the bandwidth weight*the bandwidth occupancy)*100.

The average load is compared with the load threshold to determine whether to perform cell balancing.

3. In the periodic load value storage process, the average load is stored as L12 and L13, respectively.

4. In the event load value storage process, the average load is stored as Laverage1 and Laverage2, respectively, and the process ends.

5. The DU2 receives N response messages, and the DU2 successively stores the CU load values of CU1 and CU2 as L11, L12 . . . L1N, L21, L22 . . . L2N.

6. The DU2 calculates the average load value of CU1: Laverage1=(L11+L12+ . . . +L1N)/N; and, the DU2 calculates the average load value of CU2: Laverage2=(L21+L22+ . . . +L2N)/N.

Example nine (dynamic cell balancing decision process), which includes.

1. The DU2 makes a decision for load balancing, and the DU2 acquires a high load threshold H and a low load threshold L.

2. The DU2 performs the following processing according to the load value and the load threshold.

The DU2 compares Laverage1 and Laverage2.

When Laverage1<L and Laverage2>=H, it is indicated that the CU2 is in a high load state and the CU1 is in a low load state, and it is required to perform cell balancing (the CU1 is notified of activating (or setting up) a cell, where the CU1 is a target CU; and, the CU2 is notified of deactivating (or deleting) a cell, where the CU2 is a source CU).

Otherwise, the following processing will be executed.

(1) When Laverage1>=H and average2<L, it is indicated that the CU1 is in a high load state and the CU2 is in a low load state, and it is required to perform cell balancing (the CU2 is notified of activating (or setting up) a cell, where the CU2 is a target CU; and, the CU1 is notified of deactivating (or deleting) a cell, where the CU1 is a source CU).

(2) When Laverage1<L and Laverage2<L, it is indicated that CU1 and CU2 are not in a high load state, it is unnecessary to perform cell balancing, and the process ends.

(3) When Laverage1>=H and Laverage2>=H, it is indicated that both CU1 and CU2 are in a high load state, it is unable to perform cell balancing, and the process ends.

3. Cell balancing is started.

Example ten (Dynamic cell balancing): the architecture in FIG. 4 is used, and the CU load corresponding to the DU2 is preset, CU1 has a high load (it is necessary to deactivate (or delete) a cell, and CU1 is a source CU), and CU2 has a low load (it is necessary to allocate cell resources, and CU2 is a target CU). The cell granularity for balancing is preset as 5, that is, 5 cell resources are allocated once. The following steps are included.

1. The DU (DU2) performs the following processing: cell resources are allocated to the target CU (CU2), and 5 idle and available cells are selected according to the preset cell granularity 5 (5 cells are allocated once) and then notified to the target CU (CU2) through a cell configuration message GNB-DU CONFIGURATION UPDATE.

2. The target CU receives the cell configuration message GNB-DU CONFIGURATION UPDATE, executes a cell activation (or setup) operation, and sends the result of execution to the DU through a message GNB-DU CONFIGURATION UPDATE ACKNOWLEDGE.

3. The DU (DU2) receives the message GNB-DU CONFIGURATION UPDATE ACKNOWLEDGE from the target CU. If it is assumed that the received cell number is I and when I>0, IDs and target CU IDs of the I accepted cells are stored; or otherwise, the process ends.

4. The DU allows the source CU to deactivate (or delete) a cell, and the DU selects I available cells and then notify the source CU through a configuration message GNB-DU CONFIGURATION UPDATE.

5. The source CU receives the cell configuration message GNB-DU CONFIGURATION UPDATE, executes a cell deactivation (or deletion) operation, and sends the result of execution to the DU through a message GNB-DU CONFIGURATION UPDATE ACKNOWLEDGE.

6. The DU (DU2) receives the message GNB-DU CONFIGURATION UPDATE ACKNOWLEDGE from the source CU, the information of the I cells of the DU is updated, and the process ends.

Example eleven (smooth upgrading of the CU): the architecture in FIG. 3 is used, and it is preset that CU1 is to be upgraded and CU2 is not upgraded temporarily. The following steps are included.

1. DU2 activates (or sets up) some cells on CU2.

2. DU2 ensures new users to access CU2.

3. DU2 waits for stock users to drop call naturally, and then notifies CU1 to upgrade after the call is dropped successfully.

Example twelve (a scenario where a single cell is connected to a plurality of CUs): the architecture in FIG. 3 is used, and it is preset that a cell (cell1) is to be activated (or set up). The following steps are included.

1. DU2 sends a cell configuration message GNB-DU CONFIGURATION UPDATE to CU2 to activate (or set up) the cell1, CU2 executes a cell activation (or setup) operation, and the result of execution of CU2 is sent to DU2 through a message GNB-DU CONFIGURATION UPDATE ACKNOWLEDGE.

2. DU2 sends a cell configuration message GNB-DU CONFIGURATION UPDATE to CU2 to activate (or set up) the cell1, CU2 executes a cell activation (or setup) operation, and the result of execution of CU1 is sent to DU2 through a message GNB-DU CONFIGURATION UPDATE ACKNOWLEDGE.

3. DU2 receives the GNB-DU CONFIGURATION UPDATE ACKNOWLEDGE twice, and the cell is activated (or set up) successfully.

In the embodiments of the present application, based on the scheme where one CU-CP corresponds to a plurality of DUs and one DU may correspond to a plurality of CU-CPs, the DU may be migrated from a CU-CP with a high load to a CU-CP with a low load to balance the load among CU-CPs, thereby reducing the capacity expansion, reducing the cost, and realizing the purpose of rationally allocating resource.

After a scheme of the present application is performed, the problems that the high load of a CU-CP will affect the utilization of wireless resources, leads to RRC congestion, transmission congestion or the like, seriously affect the bearing capacity of mobile communication services, results in users' call drop, users' inability to access, slow data connection switching, increased user access delay, affects the user access rate, reduces the customer satisfaction and seriously affects user experience are solved.

After a scheme of the present application is performed, the CU-CP may be upgraded seamlessly, and the call drop problem of a UE during the upgrading process is solved.

After a scheme of the present application is performed, the scenario where a single cell is connected to a plurality of CU-CPs is supported (the connection of a single cell to a plurality of CU-CPs based on a user is supported), and the UE access problem in a case where a CU-CP has a very high load is solved.

Although the preferred embodiments of the present application has been disclosed for illustrative purpose, those skilled in the art will recognize that various improvements, additions and replacements are possible, and the scope of the present application should not be limited to the above embodiments.

What is claimed is:

1. An information processing method in a baseband processing split architecture, comprising:
   receiving, by a distributed unit (DU), load information of a plurality of central units (CUs), and determining, by the DU and according to the load information of the plurality of CUs, the DU being connected to the plurality of CUs, a first CU having a load greater than a target threshold value and a second CU having a load less than the target threshold value among the plurality of CUs; and
   sending, by the DU, control signaling to the first CU and the second CU respectively to delete a number of cell(s) of the first CU and add the corresponding number of cell(s) to the second CU, to carry out load balancing between adjacent CUs by using cell as granularity
   wherein, before receiving, by the DU, load information of a plurality of CUs, the method further comprises:
   receiving, by the DU, load indication information fed back by the plurality of CUs, the load indication information containing the load information of the CUs;
   wherein determining, by the DU and according to the load information of the plurality of CUs, a first CU having a load greater than a target threshold value and a second CU having a load less than the target threshold value among the plurality of CUs further comprises:
   in response to the load information of the first CU in the load information of the plurality of CUs being greater than or equal to a first load threshold that is used for representing a load value greater than the target threshold value in a load state, determining that the first CU is in a high load state;
   in response to the load information of the second CU in the load information of the plurality of CUs being less than a second load threshold that is used for representing a load value less than the target threshold value in the load state, determining that the second CU is in a low load state; and
   triggering an operation of sending, by the DU, control signaling to the first CU and the second CU.

2. The method of claim 1, wherein delete a number of cell(s) of the first CU and add the corresponding number of cell(s) to the second CU comprises:
   in response to the DU merely performing data transmission with the first CU, directly deleting a number of cell(s) of the first CU and adding the corresponding number of cell(s) to the second CU.

3. The method of claim 1, wherein delete a number of cell(s) of the first CU and add the corresponding number of cell(s) to the second CU comprises:
   in response to the DU merely performing data transmission with the first CU, directly deleting a number of cell(s) of the first CU and adding the corresponding number of cell(s) to the second CU.

4. The method of claim 1, wherein delete a number of cell(s) of the first CU and add the corresponding number of cell(s) to the second CU comprises:
   in response to the DU performing data transmission with both the first CU and the second CU, deleting a number of cell(s) of the first CU and adding the corresponding number of cell(s) to the second CU after the data transmission of the second CU is completed.

5. The method of claim 1, wherein delete a number of cell(s) of the first CU and add the corresponding number of cell(s) to the second CU comprises:
   in response to the DU performing data transmission with both the first CU and the second CU, deleting a number of cell(s) of the first CU and adding the corresponding number of cell(s) to the second CU after the data transmission of the second CU is completed.

6. The method of claim 1, wherein, after delete a number of cell(s) of the first CU and add the corresponding number of cell(s) to the second CU, the method further comprises:
   instructing, by the DU, the second CU to access a new user in a new cell obtained after cell deletion and cell addition; and
   in response to there being no accessed stock user on the first CU, determining, by the DU, that the cell deletion and cell addition of the cell data on the first CU is completed, and notifying, by the DU, the first CU to synchronously update the cell data.

7. The method of claim 1, further comprising:
   obtaining an average load of the CUs according to at least one of the following: a percentage of a UE number of the CUs in a total UE number, CPU occupancy, memory occupancy, storage occupancy, bandwidth occupancy, a UE number weight of the DU, CPU occupancy weight, memory occupancy weight, storage index weight and bandwidth weight; and
   determining, according to the average load of the CUs, whether to balance the load among the plurality of CUs.

8. The method of claim 2, wherein, after delete a number of cell(s) of the first CU and add the corresponding number of cell(s) to the second CU, the method further comprises:
instructing, by the DU, the second CU to access a new user in a new cell obtained after cell deletion and cell addition; and
in response to there being no accessed stock user on the first CU, determining, by the DU, that the cell deletion and cell addition of the cell data on the first CU is completed, and notifying, by the DU, the first CU to synchronously update the cell data.

9. An information processing device in a baseband processing split architecture, comprising:
a load determination circuit, which is configured to receive load information of a plurality of central units (CUs), and determine, according to the load information of the plurality of CUs, a first CU having a load greater than a target threshold value and a second CU having a load less than the target threshold value among the plurality of CUs; and
a balancing circuit, which is configured to send control signaling to the first CU and the second CU respectively to instruct to delete a number of cell(s) of the first CU and add the corresponding number of cell(s) to the second CU, to carry out load balancing between adjacent CUs by using cell as granularity;
further comprising:
a receiving circuit, which is configured to receive load indication information fed back by the plurality of CUs, the load indication information containing load information of the CUs;
wherein receive load information of a plurality of central units (CUs), and determine, according to the load information of the plurality of CUs, a first CU having a load greater than a target threshold value and a second CU having a load less than the target threshold value among the plurality of CUs further comprises:
in response to the load information of the first CU in the load information of the plurality of CUs being greater than or equal to a first load threshold that is used for representing a load value greater than the target threshold value in a load state, determining that the first CU is in a high load state;
in response to the load information of the second CU in the load information of the plurality of CUs being less than a second load threshold that is used for representing a load value less than the target threshold value in the load state, determining that the second CU is in a low load state; and
triggering an operation of sending, by the DU, control signaling to the first CU and the second CU.

10. The device of claim 9, wherein the balancing circuit is further configured to: directly delete a number of cell(s) of the first CU and add the corresponding number of cell(s) to the second CU when the DU merely performs data transmission with the first CU.

11. The device of claim 9, wherein the balancing circuit is further configured to: delete a number of cell(s) of the first CU and add the corresponding number of cell(s) to the second CU after the data transmission of the second CU is completed, in response to the DU performing data transmission with both the first CU and the second CU.

12. The device of claim 9, wherein the load determination circuit is further configured to: determine that the first CU is in a high load state, in response to the load information of the first CU in the load information of the plurality of CUs being greater than or equal to a first load threshold that is used for representing a load value greater than the target threshold value in a load state; determine that the second CU is in a low load state, in response to the load information of the second CU in the load information of the plurality of CUs being less than a second load threshold that is used for representing a load value less than the target threshold value in the load state; and, trigger an operation of sending control signaling to the first CU and the second CU.

13. A non-transitory computer-readable storage medium storing a computer program which, when executed by a processor, cause the processor to perform an information processing method in a baseband processing split architecture, the method comprising:
receiving, by a distributed unit (DU), load information of a plurality of central units (CUs), and determining, by the DU and according to the load information of the plurality of CUs, a first CU having a load greater than a target threshold value and a second CU having a load less than the target threshold value among the plurality of CUs; and sending, by the DU, control signaling to the first CU and the second CU respectively to instruct to to delete a number of cell(s) of the first CU and add the corresponding number of cell(s) to the second CU, to carry out load balancing between adjacent CUs by using cell as granularity;
wherein, before receiving, by the DU, load information of a plurality of CUs, the method further comprises:
receiving, by the DU, load indication information fed back by the plurality of CUs, the load indication information containing the load information of the CUs;
wherein determining, by the DU and according to the load information of the plurality of CUs, a first CU having a load greater than a target threshold value and a second CU having a load less than the target threshold value among the plurality of CUs further comprises:
in response to the load information of the first CU in the load information of the plurality of CUs being greater than or equal to a first load threshold that is used for representing a load value greater than the target threshold value in a load state, determining that the first CU is in a high load state;
in response to the load information of the second CU in the load information of the plurality of CUs being less than a second load threshold that is used for representing a load value less than the target threshold value in the load state, determining that the second CU is in a low load state; and
triggering an operation of sending, by the DU, control signaling to the first CU and the second CU.

* * * * *